SINGLE MANEUVERING LEVEL CONTROL FOR TRACKED VEHICLES

Filed Aug. 27, 1969

SINGLE MANEUVERING LEVEL CONTROL FOR TRACKED VEHICLES
Filed Aug. 27, 1969 2 Sheets-Sheet 2
FIG. 4
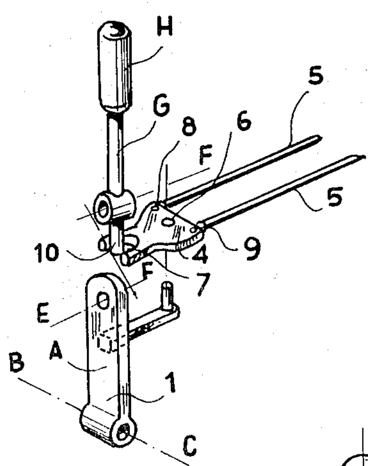
FIG. 6
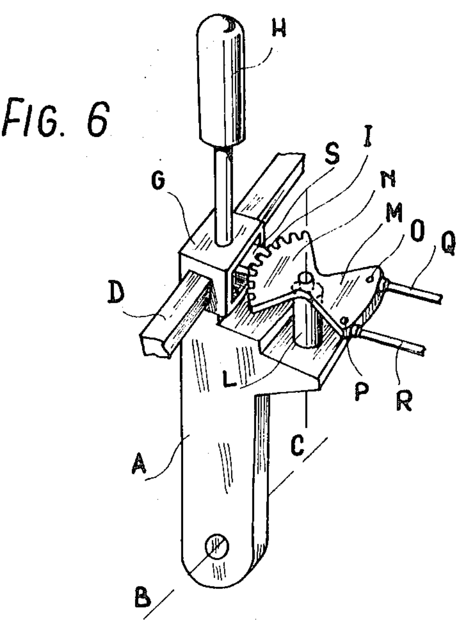
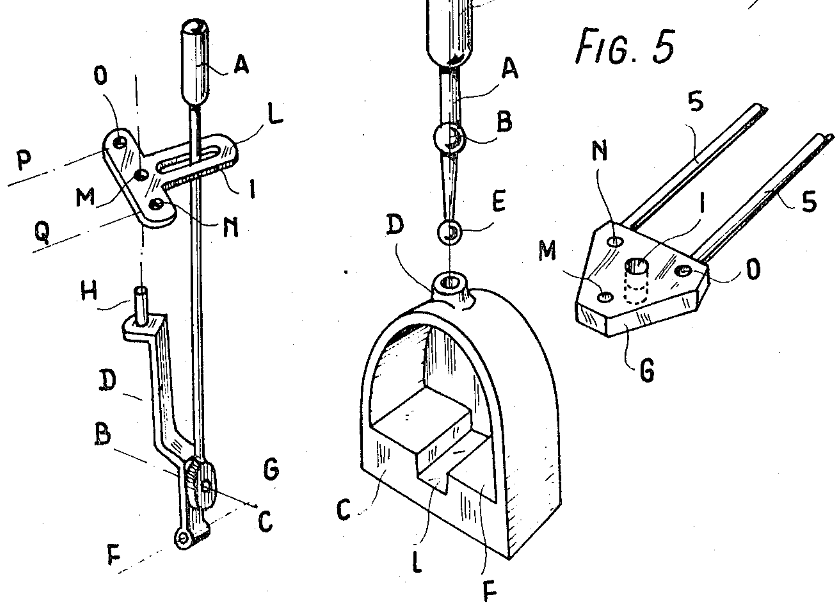
FIG. 7

United States Patent Office 3,620,096

Patented Nov. 16, 1971

3,620,096
SINGLE MANEUVERING LEVEL CONTROL FOR TRACKED VEHICLES

Gianni Scolari, Via Turati 35, Turin, Italy

Filed Aug. 27, 1969, Ser. No. 853,403
Claims priority, application Italy, Aug. 28, 1968, 52,963/68
Int. Cl. G05g 9/00
U.S. Cl. 74—469 4 Claims

ABSTRACT OF THE DISCLOSURE

A single maneuvering lever controls the delivery of hydraulic fluid of both the variable-feed pumps of hydraulic motors employed in tracked vehicles. The several variances of mechanical assembly are, however, based on the same principle of controlling with a single lever, operable with one single hand, both tracks of a tracked vehicle.

BRIEF DESCRIPTION OF THE PRIOR ART

The device of the present invention is concerned with tracked vehicles, such as tractors, having each track moved by a separate hydraulic motor fed by its respective variable-delivery pump. It is known that in these vehicles, a change in travelling direction is achieved by means of different speeds of the two tracks caused by a difference in the fluid delivery of the pumps feeding the track motors. The variation in the speed of the vehicle is obtained by means of a correspondingly equal variation in the delivery of the pumps.

It is also known that these maneuvers are effected by the actuation of two separate controls, one for each pump. The controlling of the fluid delivery of the pumps is usually obtained by manipulating two levers hinged at one end to the respective pumps, and being free to rotate through an angle of about 90°. The extreme forward and rear positions of the levers correspond to the maximum delivery in the forward or backward directions, while the central positions of the levers are neutral positions and the delivery is null.

BRIEF SUMMARY OF THE INVENTION

The device of the present invention permits the operation of a tracked vehicle by varying simultaneously and in equal or different manner the fluid delivery of the two pumps by moving a single control and using one hand only.

The device, briefly stated, comprises essentially a maneuvering lever extending upward and carrying at its upper end a suitable handgrip, said lever being movable both axially in the direction of travel of the vehicle and in the direction axially normal or transverse thereto.

The maneuvering lever is connected to the usual levers of the delivery regulators of the two pumps in such a way that the movement of the maneuvering lever, in the direction of travel of the vehicle, imparts to the levers of the regulators an equal and unidirectional rotational movement, increasing or reducing the speed of the vehicle; while the movement of the maneuvering lever in the direction perpendicular to the direction of travel of the vehicle imparts to the levers of the regulators, rotational movements in opposed direction, thus causing a variation in the vehicle travelling direction.

BRIEF DESCRIPTIONS OF THE DRAWINGS

The objects and advantages of the present invention will become apparent from the following detailed description of the various embodiments thereof and from the accompanying drawings in which:

FIG. 4 is an exploded perspective view of a fourth embodiment of the device of the present invention;

FIG. 5 is an exploded perspective view of a fifth embodiment of the device of the present invention;

FIG. 6 is a schematic perspective view of a sixth embodiment of the device of the present invention; and FIG. 7 is a schematic perspective view of a seventh embodiment of the device of the present invention

DETAILED DESCRIPTION OF A FIRST EMBODIMENT OF THE INVENTION

Figure 1:
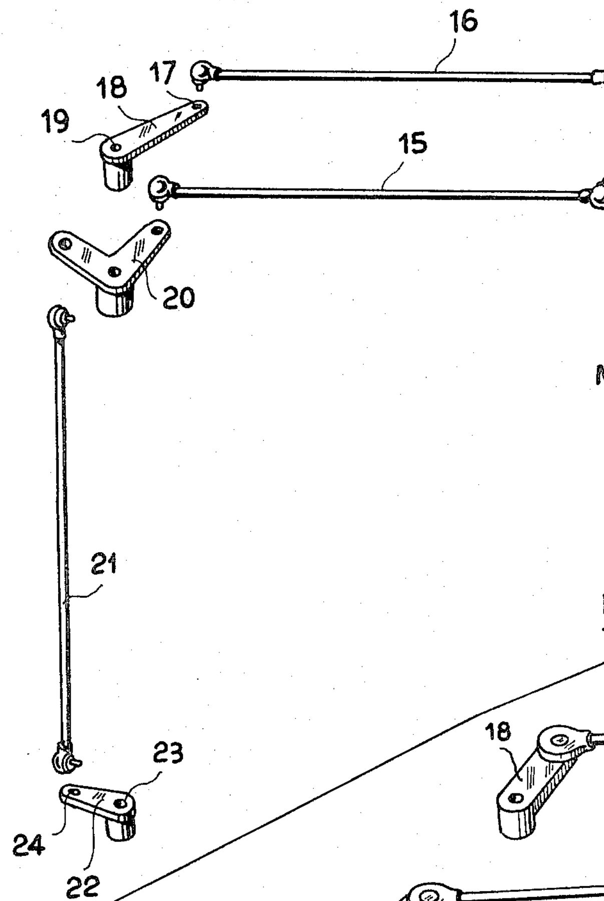
FIG. 1 is an exploded perspective view of a first embodiment of the device of the present invention.

A first embodiment of this invention is represented in FIG. 1, wherein the maneuvering lever comprises two sections A and G. The lower section A is pivotable at its lower end in the direction of the horizontal axis B–C and carries at its upper end, set on a pivot along the axis E–F orthogonal to axis B–C, the upper section G. Section G has three arms, H, I and L, placed at 90° to one another; the central arm extends upwardly and terminates with a handgrip H, while the other two arms, I and L, are axially aligned with one another, as shown, and are provided with spherical pivots 1 and 2. Two bent levers 3 and 4 are pivotable at 5 and 6 by pivots 7 and 8 onto section A of the maneuvering lever along an axis M–N parallel to axis B–C, one on each side of section A. The two bent levers 3 and 4 have a vertical arm and a horizontal arm when the device lies in the central or intermediate neutral position. The ends of the horizontal arms of levers 3 and 4 are connected by spherical pivots at 9 and 10 to linkages 11 and 12 pivoted at their upper ends on spherical pivots of section G of the maneuvering lever. Ends 13 and 14 of the vertical arms of levers 3 and 4 are connected by similar spherical pivots to linkages 15 and 16 lying substantially on the same horizontal plane with respect to each other and in planes substantially vertical and parallel to the rotation planes of levers 3 and 4. Linkage 16 is connected by a ball joint to the end 17 of lever 18 of the delivery regulator of one pump upon which end 19 pivots. Linkage 15 instead is connected by a ball joint to one arm of bent lever 20, the second arm of which is connected to linkage 21, connected in turn to the end of arm 22 of lever 23 of the delivery regulator of the other pump upon which end 24 pivots.

OPERATION OF THE DEVICE

The operator, by working handgrip H, may rotate the handgrip H, and hence the section G of the maneuvering lever, about axis E–F without moving section A of the lever, or he may rotate section G, rigidly coupled to section A, about axis B–C. In the first case, the bent levers 3 and 4 rotate through linkages 11 and 12, in opposite directions and displace longitudinally and in opposite directions linkages 15 and 16. These in turn will, either directly as linkage 16, or indirectly through lever 20 and linkage 21, as linkage 15, rotate levers 18 and 23 of the pump regulators in opposite directions, thus obtaining different fluid deliveries. To changes in fluid delivery correspond changes in the speeds of the motors and of the associated tracks, and hence changes in the direction of travel of the vehicle.

In the second case, the rotation of section G. rigidly coupled to section A, about axis B–C, displaces linkages 15 and 16 longitudinally in the same direction and by the same amount, causing thus in the pumps an equal change of delivery and, correspondingly, a change of the vehicle speed.

A rotation of handgrip H about axis E–F may be simultaneously effected with a rotation of section A about axis B–C, thus resulting in a combined action on the delivery regulators and in simultaneous changes of vehicular speed and direction, as required by the operator.

As seen, the device hereabove described renders possible for the operator to drive a tracked vehicle with a hand, thus leaving free the other hand to execute additional maneuvers, as for example, operating a bucket.

DETAILED DESCRIPTION OF A SECOND EMBODIMENT OF THE INVENTION

Figure 2:
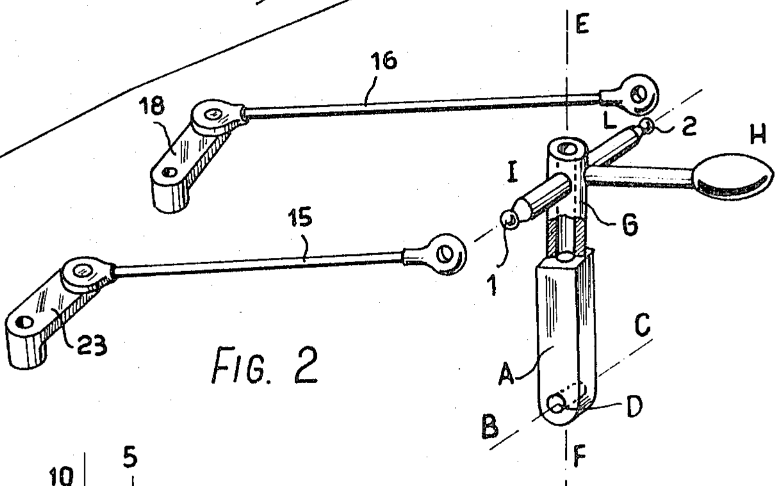
FIG. 2 is an exploded perspective view showing a second embodiment of the device of the present invention.

A second embodiment of the invention is represented in FIG. 2, wherein sections A and G constitute the maneuvering lever, as explained heretofore. The lower section A is pivotable at its lower end along the axis B–C and carries, rotatable on pivot D and along the rotational axis E–F orthogonal to B–C, the upper section G which is provided with a handgrip H and two arms I and L aligned parallel to axis B–C and opposed with respect to the rotational axis E–F. Arms I and L carry, at their ends, ball joints 1 and 2 pivotable on one end of horizontal linkages 15 and 16 acting on levers 18 and 23 which vary the delivery of the two pumps.

The operation is analogous to the operation of the first embodiment shown in FIG. 1. The upper section G of the maneuvering lever may rotate about the two orthogonal axes E–F and B–C.

Section G, by its rotation about axis E–F, causes longitudinal movements of linkages 15 and 16 in opposite directions, different fluid deliveries in the pumps and consequently a change in the direction of travel of the vehicle. The two sections A and G, when rotating together about axis B–C, cause equal delivery changes and, hence, the vehicle either accelerates or decelerates. The combined rotations about axes E–F and B–C cause simultaneous changes in both speed and direction of the vehicle.

DETAILED DESCRIPTION OF A THIRD EMBODIMENT OF THE INVENTION

Figure 3:
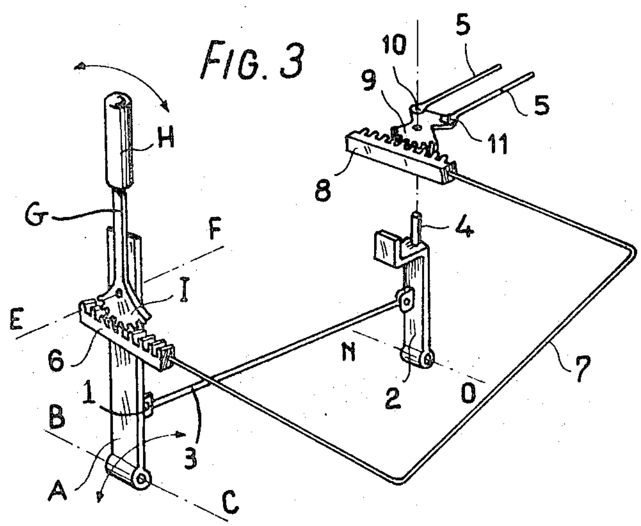
FIG. 3 is a schematic perspective view of a third embodiment of the device of the present invention.

A third embodiment is represented in FIG. 3, wherein A is the lower section of the maneuvering lever, pivotable at its lower end along the horizontal axis B–C, and carries at its upper end, pivoted along axis E–F orthogonal to B–C, the upper section G which has at its upper end the handgrip H and, at the other end, the sector gear I meshing with a rack 6.

The lower section A of the maneuvering lever is connected at 1 by way of linkage 3 to lever 2 pivotable at its lower end along axis N–O parallel to B–C and carrying at its upper end the pivot 4. Rocker 9, provided with a sector gear and arms 10 and 11 which are connected to linkages 5 for actuating the regulators, may rotate about pivot 4.

A rack 8 meshes with the sector gear of the rocker 9 and is connected by the push-pull bowden 7 to the rack 6. In this case, the rotation of the maneuvering lever about axis B–C causes equal displacements of the two linkages 5. Rotation about axis E–F by the upper section G of the maneuvering lever displaces racks 6 and 8, obtaining the rotation of the rocker 9 and the opposite displacements of linkages 5.

A variant of this third embodiment is obtained by providing the transmission of the motion from rack 6 to rack 8 by means of a hydraulic device as a substitute for the bowden 7.

DETAILED DESCRIPTION OF A FOURTH EMBODIMENT OF THE INVENTION

A fourth embodiment of the present invention is represented in FIG. 4. Again, A is the lower section of the maneuvering lever, pivotable at its lower end along the horizontal axis B–C and carrying at its upper end, pivotable along axis E–F orthogonal to axis B–C, the second section G.

The lower section A of the maneuvering lever supports, by means of a pivot 3, the rocker 4 which lies in a plane parallel to axis B–C.

Rocker 4 is provided with a seat 6 for pivot 3 and with a fork 7 and is connected at the ends of its arms to linkages 5 which control the pumps.

The upper section G of the maneuvering lever carries at its upper end the handgrip H and, at its lower end, the appendix 10 which is placed within the fork 7 of rocker 4. The rotation of the maneuvering lever about axis B–C displaces by the same amount linkages 5, while the rotation of the upper section G about axis E–F displaces the two linkages 5 in opposite directions because the rocker 4 is caused to rotate by the appendix 10 lying within fork 7.

According to a variant of this fourth embodiment, the motion transmission from the second section G of the maneuvering lever to the rocker 4 may be effected by means of two sector gears which are made respectively a part of lever G and rocker 4.

DETAILED DESCRIPTION OF A FIFTH EMBODIMENT OF THE INVENTION

A fifth embodiment of the present invention is shown in FIG. 5. In this figure, the maneuvering lever is formed by a single section A which is provided with a handgrip H at the upper end, is pivotable by a ball joint B at an intermediate point and has its lower end shaped as a spherical pivot E.

The support C has a base F with a groove L and carries, in its upper part, the spherical seat D for pivot B of lever A.

The rocker G carries a pivot 1 on the underside, a seat M for the spherical pivot E of lever A and the connections N and O for linkages 5 at the ends of the rocker arms.

The rocker G is placed on base F with pivot 1 protruding within the groove L and free to slide across the groove L and to rotate on its own axis.

The movement of handgrip H in the direction of groove L moves the rocker in the direction L parallel to itself, thus displacing linkages 5 in the same manner.

The movement of handgrip H in a direction perpendicular to the groove L causes the rocker to rotate about the axis of pivot 1. Hence, the displacement of linkages 5 in opposite directions.

As a variant, the lever may be caused to slide rather than to rotate.

DETAILED DESCRIPTION OF A SIXTH EMBODIMENT OF THE INVENTION

A sixth embodiment of the present invention is shown in FIG. 6. The maneuvering lever comprises, again, two sections, A and G. Section A is pivotable at its lower end along the horizontal axis B–C and carries at its upper end a guide D parallel to axis B–C over which guide the second section G of the maneuvering lever is slidably mounted.

Section G comprises a slide S slidably fitted on D, a handgrip H and a rack 1 mounted on slide S parallel to its direction of movement.

On a pivot L, fixedly coupled to section A of the maneuvering lever, there is mounted pivotably a rocker M provided with a sector gear N and connections O and P, at the ends of the rocker arms, for the connection of linkages Q and R which are connected to the pump regulators.

The sector gear N meshes with rack 1. When operating, the rotation of the maneuvering lever about axis B–C causes an equal displacement of linkages Q and R, while the sliding movement of slide G along guide D causes the displacement of linkages D and Q in opposite directions.

DETAILED DESCRIPTION OF A SEVENTH EMBODIMENT OF THE INVENTION

A seventh embodiment of the present invention is shown in FIG. 7. In this figure, the maneuvering lever A is pivotable at its lower end along the horizontal axis B–C on a support D which carries at its upper end a pivot H and is pivoted at its bottom along the axis F–G, orthogonal to B–C.

A rocker 1 forms a slit L, a seat M for pivot H of support D and two connections N and O connected to the pump regulators through linkages P and Q.

When operating, the rotation of the lever about axis F–G causes an equal displacement of linkages P and Q.

The rotation of lever A about axis B–C, acting against the edges of slit L and rocker 1, causes the rotation of rocker 1 about pivot M and, hence, the displacement of linkages P and Q in opposite directions.

What is claimed is:

1. In a hydraulically operated tracked vehicle, a device for obtaining simultaneous variations in the delivery regulators of the two variable delivery pumps of said vehicles comprising

- a single maneuvering lever movable in two planes perpendicular to each other,
- said maneuvering lever comprising a first lower section pivotable at the lower end thereof along a horizontal axis, and
- a second upper section pivotally mounted on the upper end of said first section,
- said upper section being mounted for rotation along an axis orthogonal to said horizontal axis,
- a rocker having arms operatively connected to the delivery regulators of said pumps, and
- means for connecting said upper section operatively to said rocker at two points of said upper section opposite and equidistant with respect to the axis of rotation.

2. The device, according to claim 1, wherein the connecting means to the rocker comprises sector gears, racks and bowden.

3. The device, according to claim 1, said rocker comprising a rocker fork, wherein the connecting means to the rocker comprises the lower end of the upper section of the said maneuvering lever acting between arms of said rocker fork.

4. The device, according to claim 1, wherein said maneuvering lever is pivotable at its lower end along a horizontal axis on a support which is pivotable along an axis perpendicular to said horizontal axis, said support passing through a slit of said rocker which is rotatable with respect to said support.

References Cited

UNITED STATES PATENTS

| | | | |
|---|---|---|---|
| 2,393,324 | 1/1946 | Joy | 180—6.48 |
| 2,967,436 | 1/1961 | Steinlein | 74—471 |
| 3,172,300 | 3/1965 | Schneider | 74—471 |
| 3,181,389 | 5/1965 | Richard | 74—471 X |
| 3,385,387 | 5/1968 | McKeown | 180—6.48 |

MILTON KAUFMAN, Primary Examiner

U.S. Cl. X.R.

74—491; 180—6.48